(No Model.)
F. T. RIEGEL.
HUB FOR VEHICLE WHEELS.
No. 255,024. Patented Mar. 14, 1882.
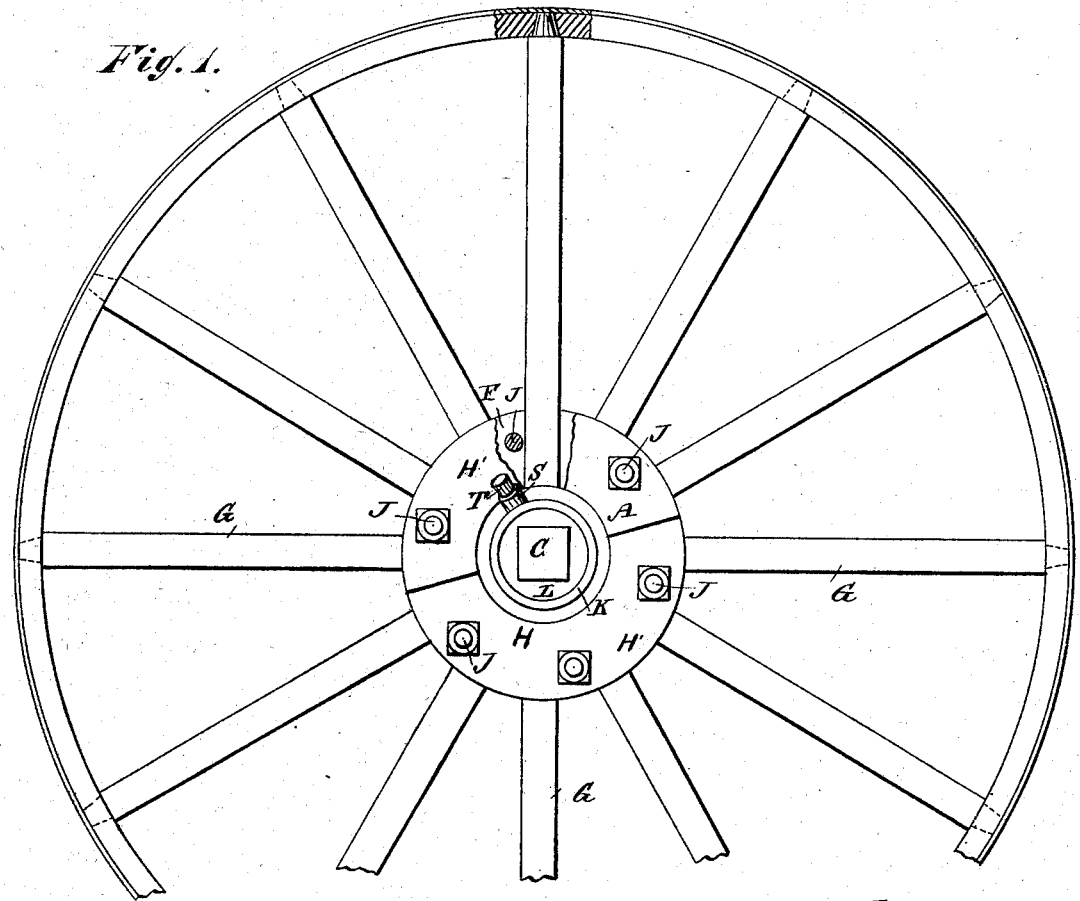
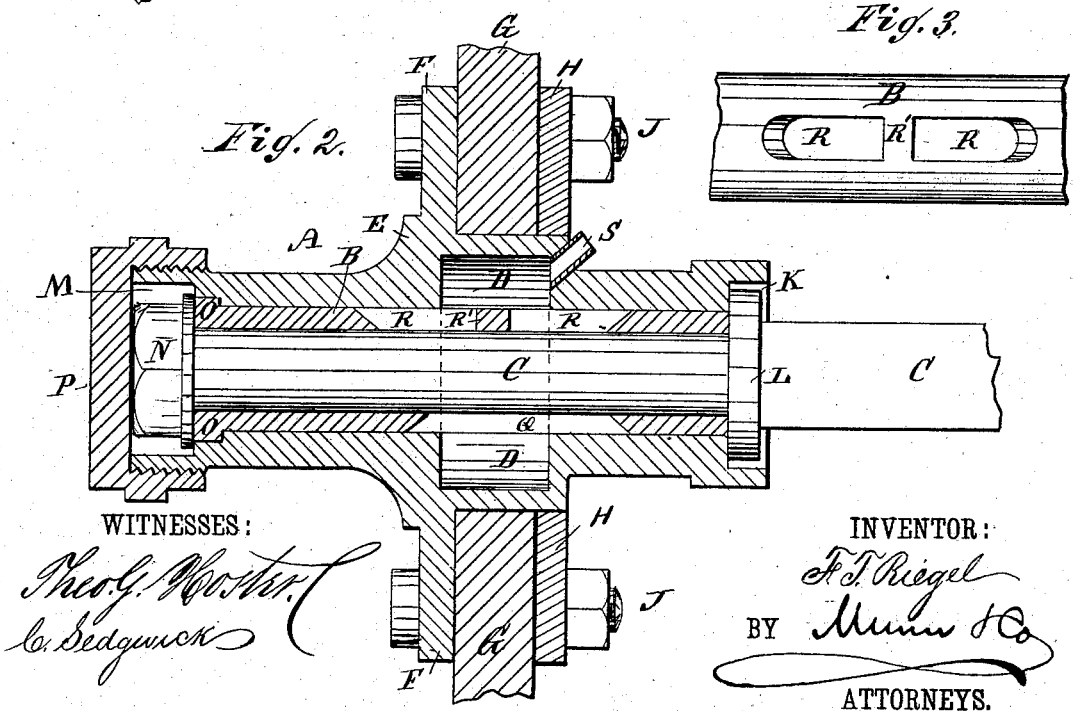
WITNESSES:
Theo. G. Hoster
C. Sedgwick
INVENTOR:
F. T. Riegel
BY Munn & Co
ATTORNEYS.

UNITED STATES PATENT OFFICE.

FRANCIS T. RIEGEL, OF PHILADELPHIA, PENNSYLVANIA.

HUB FOR VEHICLE-WHEELS.

SPECIFICATION forming part of Letters Patent No. 255,024, dated March 14, 1882.

Application filed January 5, 1882. (No model.)

*To all whom it may concern:*

Be it known that I, FRANCIS T. RIEGEL, of the city and county of Philadelphia, Pennsylvania, have invented a new and Improved Hub for Vehicles, of which the following is a full, clear, and exact description.

The object of my invention is to facilitate the lubricating of the axle of the carriage or wagon wheel.

The invention consists in a hub provided in its inner side with an annular chamber for receiving lubricating material, which chamber is provided with a filling-tube which can be closed by a plug or screw-cap, as will be more fully described hereinafter.

Reference is to be had to the accompanying drawings, forming part of this specification, in which similar letters of reference indicate corresponding parts in all the figures.

Figure 1 is a longitudinal elevation of the inner side of a wheel provided with my improved hub, parts being shown in section. Fig. 2 is a longitudinal sectional elevation of my improved hub. Fig. 3 is a plan view of the top of the axle-box.

The hub A is made of metal, preferably cast-iron, and is provided with a longitudinal central aperture for the axle-box B, fitting on the end of the axle C. The central part, E, of the hub is raised, and in it is formed an annular chamber, D, around the axle-box. This raised part E of the hub is provided with an annular flange, F, integral therewith, against which the inner ends of the spokes G are placed, these inner ends of the spokes resting on the raised part E of the hub, and are held in place by the flange H, composed of the two semi-annular plates H, placed against the opposite sides of the spokes and held firmly against the spokes by screw-bolts J, passing through the annular flange F and the plates H between the spokes, as shown in Fig. 1. This flange being made in two parts, permits either of them being removed to repair the wheel without disturbing the other. It also permits of it being removed from the wheel without removing the wheel from the axle. The flange F will be on the outside of the wheel and the plates H on the inner side of the same.

The hub is provided at its inner end with a circular recess, K, for the collar L of the axle, and at its front end with a circular recess, M, for the nut N, screwed on the outer end of the axle and holding the axle-box B in place.

The axle-box B is provided at its outer end with a collar or annular projection, O, fitting in a corresponding recess in the hub a short distance inside of the outer end of the same. The outer end of the hub is threaded externally to permit screwing a cap, P, on this outer end.

The axle-box is provided with a longitudinal slot, Q, in its bottom and a longitudinal slot, R, interrupted by a transverse piece, R', in its top. The hub is provided at the top and inner side of the enlarged part E with a downwardly-inclined tube, S, through which lubricating material can be poured into the annular chamber D, which tube can be closed at its outer end by means of a plug, T, or a screw-cap. The axle and the axle-box can thus be lubricated very conveniently without removing the wheel from the axle or removing any other parts but the plug T. The chamber D can contain a considerable quantity of lubricating material, which will last some time, and thus a frequent replenishing of this lubricating material will not be necessary. If the cap P and the nut N are unscrewed, the wheel can be removed from the axle very easily and rapidly.

I do not limit myself to the number of slots in the axle-box nor to the peculiar form of the same, and, if desired, the axle-box can be provided with any other suitable apertures.

Having thus described my invention, I claim as new and desire to secure by Letters Patent—

1. In a vehicle-wheel, the combination, with the hub A, provided with the annular flange F, of the flange H, composed of the semicircular plates bolted to the said flange F, substantially as and for the purpose set forth.

2. In a vehicle-wheel, the hub A, provided with the central raised portion, E, having the annular flange F integral therewith and on the outer end of this hub, in combination with the flange H and the bolts J, substantially as and for the purpose set forth.

3. In a vehicle-wheel, the combination, with the apertured axle-box B, of the hub A, provided with the annular oil-chamber D′, the central raised portion, E, and the annular flange F, integral therewith and on the outer end of the hub, and the flange H, formed of the semicircular plates bolted to the said flange F, substantially as and for the purpose set forth.

FRANCIS T. RIEGEL.

Witnesses:
JAMES SHANLY,
JACOB M. BECHTEL.